(12) United States Patent
Hori et al.

(10) Patent No.: US 12,475,820 B2
(45) Date of Patent: Nov. 18, 2025

(54) VEHICULAR DISPLAY CONTROL DEVICE, VEHICULAR DISPLAY SYSTEM, VEHICLE, DISPLAY METHOD, AND NON-TRANSITORY COMPUTER-READABLE MEDIUM

(71) Applicant: TOYOTA JIDOSHA KABUSHIKI KAISHA, Toyota (JP)

(72) Inventors: Keigo Hori, Toyota (JP); Ryota Hamabe, Nisshin (JP); Takahiro Hirota, Nukata-gun (JP); Yoshinori Murata, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/743,695

(22) Filed: Jun. 14, 2024

(65) Prior Publication Data

US 2024/0331593 A1 Oct. 3, 2024

Related U.S. Application Data

(63) Continuation of application No. 18/130,603, filed on Apr. 4, 2023, now Pat. No. 12,057,039, which is a (Continued)

(30) Foreign Application Priority Data

Sep. 17, 2021 (JP) .................................. 2021-151951

(51) Int. Cl.
*G09G 3/00* (2006.01)
*B60K 35/10* (2024.01)
(Continued)

(52) U.S. Cl.
CPC ............. *G09G 3/002* (2013.01); *B60K 35/10* (2024.01); *B60K 35/23* (2024.01); *B60K 35/50* (2024.01);
(Continued)

(58) Field of Classification Search
None
See application file for complete search history.

(56) References Cited

U.S. PATENT DOCUMENTS 10,372,130 B1 8/2019 Kaushansky et al.
2003/0023353 A1 1/2003 Badarneh
(Continued)

FOREIGN PATENT DOCUMENTS

CN 109109781 A 1/2019
CN 110603166 A 12/2019
(Continued)

OTHER PUBLICATIONS

U.S. Appl. No. 17/385,017, filed Jul. 26, 2021 in the name of Takabatake et al.
(Continued)

*Primary Examiner* — Matthew Yeung
(74) *Attorney, Agent, or Firm* — Oliff PLC

(57) ABSTRACT

A vehicular display control device including: memory; and a processor coupled to the memory, wherein the processor is configured to: detect when a right-side operation region provided on a right side of a steering wheel has been operated; detect when a left-side operation region provided on a left side of the steering wheel has been operated; in a case in which operation of the right-side operation region has been detected, display a right-side image corresponding to the right-side operation region in a right-side area of a display region set in front of a driving seat; and in a case in which operation of the left-side operation region has been (Continued)

detected, display a left-side image corresponding to the left-side operation region in a left-side area of the display region.

16 Claims, 8 Drawing Sheets

Related U.S. Application Data continuation of application No. 17/872,398, filed on Jul. 25, 2022, now Pat. No. 11,657,741.

(51) Int. Cl.
*B60K 35/23* (2024.01)
*B60K 35/50* (2024.01)
*G06F 3/01* (2006.01)

(52) U.S. Cl.
CPC ..... *G06F 3/011* (2013.01); *G09G 2340/0464* (2013.01); *G09G 2354/00* (2013.01); *G09G 2380/10* (2013.01)

(56) References Cited

U.S. PATENT DOCUMENTS

| | | |
|---|---|---|
| 2006/0241818 A1 | 10/2006 | Kumon |
| 2010/0268426 A1 | 10/2010 | Pathak et al. |
| 2013/0166147 A1 | 6/2013 | Chudzinski et al. |
| 2013/0293364 A1 | 11/2013 | Ricci et al. |
| 2014/0165005 A1 | 6/2014 | Takikawa et al. |
| 2015/0145790 A1 | 5/2015 | Kim et al. |
| 2015/0291032 A1* | 10/2015 | Kim ................. B62D 1/04 280/779 |
| 2016/0046188 A1* | 2/2016 | Wild .................. B60K 35/00 701/36 |
| 2017/0269704 A1 | 9/2017 | Akita et al. |
| 2017/0303842 A1 | 10/2017 | Yoshida et al. |
| 2018/0326851 A1 | 11/2018 | Kim et al. |
| 2018/0373343 A1 | 12/2018 | Hashimoto et al. |
| 2019/0144004 A1 | 5/2019 | Mimura et al. |
| 2019/0283770 A1 | 9/2019 | Kubota et al. |
| 2020/0156662 A1 | 5/2020 | Mimura et al. |
| 2020/0393263 A1 | 12/2020 | Kleen et al. |
| 2020/0406755 A1 | 12/2020 | Davis et al. |
| 2021/0131818 A1 | 5/2021 | Yamaguchi et al. |
| 2021/0138903 A1 | 5/2021 | Kozono et al. |
| 2021/0349592 A1 | 11/2021 | Lemcke et al. |
| 2022/0055482 A1* | 2/2022 | Brissman ............... B60K 35/10 |
| 2022/0066570 A1 | 3/2022 | Takabatake et al. |
| 2022/0212689 A1 | 7/2022 | Nakao et al. |

FOREIGN PATENT DOCUMENTS

| | | |
|---|---|---|
| DE | 102012009024 A1 | 6/2013 |
| DE | 102018218843 A1 | 5/2019 |
| DE | 102018203462 A1 | 9/2019 |
| JP | 2006-298241 A | 11/2006 |
| JP | 2007-106353 A | 4/2007 |
| JP | 2012-018019 A | 1/2012 |
| JP | 2014-182602 A | 9/2014 |
| JP | 2015-161632 A | 9/2015 |
| JP | 2016-064773 A | 4/2016 |
| JP | 2017-039392 A | 2/2017 |
| JP | 2019-006277 A | 1/2019 |
| JP | 2019-007794 A | 1/2019 |
| JP | 2020-117093 A | 8/2020 |
| JP | 2021-075157 A | 5/2021 |
| WO | 2018/220834 A1 | 12/2018 |
| WO | 2019/170387 A1 | 9/2019 |

OTHER PUBLICATIONS

U.S. Appl. No. 17/872,398, filed Jul. 25, 2022 in the name of Keigo Hori, et al.
Oct. 14, 2022 Office Action Issued In U.S. Appl. No. 17/385,017.
Nov. 4, 2022 Office Action Issued in U.S. Appl. No. 17/872,398.
Jan. 11, 2023 Notice Of Allowance issued in U.S. Appl. No. 17/872,398.
Mar. 9, 2023 Office Action issued in U.S. Appl. No. 17/385,017.
Jun. 21, 2023 Notice of Allowance Issued In U.S. Appl. No. 17/385,017.
Mar. 28, 2024 Notice of Allowance Issued in U.S. Appl. No. 18/130,603.
May 8, 2024 U.S. Office Action issued in U.S. Appl. No. 18/242,080.
Oct. 12, 2023 Office Action issued in U.S. Appl. No. 18/130,603.

* cited by examiner

VEHICULAR DISPLAY CONTROL DEVICE, VEHICULAR DISPLAY SYSTEM, VEHICLE, DISPLAY METHOD, AND NON-TRANSITORY COMPUTER-READABLE MEDIUM

CROSS-REFERENCE TO RELATED APPLICATION

This application is a continuation of U.S. application Ser. No. 18/130,603, filed Apr. 4, 2023, which claims the benefit of U.S. application Ser. No. 17/872,398, filed Jul. 25, 2022, which in turn claims priority under 35 USC 119 from Japanese Patent Application No. 2021-151951, filed on Sep. 17, 2021. The disclosure of each of the priority applications is hereby incorporated by reference herein.

BACKGROUND

Technical Field

The present disclosure relates to a vehicular display control device, a vehicular display system, a vehicle, a display method, and a non-transitory computer-readable medium storing a program.

Related Art

Japanese Patent Application Laid-Open (JP-A) No. 2021-75157 discloses a configuration in which operation switches are provided on the left and right of a steering wheel. In JP-A No. 2021-75157, images of the operation switches are displayed on a display screen and different functions are allocated to the respective operation switches.

In JP-A No. 2021-75157, images of both the left and right operation switches (operation regions) are displayed on the display screen, and so a large display region needs to be secured. However, if an image of the operation switches on one side alone were to be displayed, it would be difficult to discern at a glance which operation switches were being displayed, and so there is room for improvement from the perspective of improving occupant usability.

SUMMARY

The present disclosure provides a vehicular display control device, a vehicular display system, a vehicle, a display method, and a non-transitory computer-readable medium storing a program that enable occupant usability to be improved in configurations capable of displaying an image of an operation region.

A first aspect of the present disclosure is a vehicular display control device including: memory; and a processor coupled to the memory, wherein the processor is configured to: detect when a right-side operation region provided on a right side of a steering wheel has been operated; detect when a left-side operation region provided on a left side of the steering wheel has been operated; in a case in which operation of the right-side operation region has been detected, display a right-side image corresponding to the right-side operation region in a right-side area of a display region set in front of a driving seat; and in a case in which operation of the left-side operation region has been detected, display a left-side image corresponding to the left-side operation region in a left-side area of the display region.

In the vehicular display control device according to the first aspect, the right-side image corresponding to the right-side operation region is displayed in the right-side area of the display region set in front of the driving seat in cases the right-side operation region provided on the right side of the steering wheel has been operated. Similarly, the left-side image corresponding to the left-side operation region is displayed in the left-side area of the display region in cases the left-side operation region provided on the left side of the steering wheel has been operated. This enables a wide area of the display region to be secured compared to cases in which both the right-side image and the left-side image are always displayed on the display region.

Moreover, since the right-side image is displayed in the right-side area of the display region whereas the left-side image is displayed in the left-side area of the display region, an occupant can intuitively ascertain which operation region the displayed image corresponds to out of the right-side operation region or the left-side operation region. Note that here, the "right side" indicates the right side in a state facing a direction of progress of the vehicle, and the "left side" indicates the left side in a state facing the direction of progress of the vehicle.

In a second aspect of the present disclosure, in the first aspect, the processor may be configured to: always display a central image indicating a vehicle state in a central area of the display region; and display the right-side image further toward the right side than the central image, and display the left-side image further toward the left side than the central image.

In the vehicular display control device according to the second aspect, the occupant may even more easily ascertain which operation region the displayed image corresponds to out of the right-side operation region or the left-side operation region.

In a third aspect of the present disclosure, in the second aspect, the processor may be configured to move the central image toward the left side when displaying the right-side image, and move the central image toward the right side when displaying the left-side image.

In the vehicular display control device according to the third aspect, since the central image is moved, the corresponding right-side image or left-side image may be displayed in a large size, even in cases in which the display region is relatively small.

In a fourth aspect of the present disclosure, in any one of the above aspects, the processor may be configured to: display the right-side image as an animation so as to move from a lower-right side end of the display region; and display the left-side image as an animation so as to move from a lower-left side end of the display region.

In the vehicular display control device according to the fourth aspect, since the display is an animation, the occupant may intuitively ascertain that the image (the right-side image or left-side image) displayed on the display region corresponds to an operation region (the left-side operation region or right-side operation region) provided on the steering wheel.

In a fifth aspect of the present disclosure, in any one of the above aspects, the processor may be configured to: display information relating to driving assistance in the right-side image and display information relating to onboard equipment in the left-side image; and display the right-side image in cases in which operation of both the right-side operation region and the left-side operation region has been detected.

In the vehicular display control device according to the fifth aspect, the right-side image including the driving assistance-related information is displayed in cases in which operation of both the right-side operation region and the left-side operation region has been detected. This enables the occupant to prioritize checking information relating to driving assistance.

In a sixth aspect of the present disclosure, in any one of the above aspects, the processor nay be configured to: display a right-side suggestion image that is selectable using the right-side operation region in the right-side area of the display region; and display a left-side suggestion image that is selectable using the left-side operation region in the left-side area of the display region.

In the vehicular display control device according to the sixth aspect, in cases in which a suggestion from a navigation system or the like is displayed using the right-side suggestion image or the left-side suggestion image, this suggestion is displayed at a position corresponding to the pertinent operation region, thereby enabling the occupant to intuitively ascertain the position of the operation region they should operate.

In a seventh aspect of the present disclosure, in any one of the above aspects, the processor may be configured to display the right-side image and the left-side image in the display region set on a windshield glass using a head-up display device installed to a vehicle.

In the vehicular display control device according to the seventh aspect, the contents of the corresponding right-side image or left-side image can be checked in a state in which the occupant is directing their gaze toward the front while driving.

An eighth aspect of the present disclosure is a vehicular display system including: the vehicular display control device of any one of above aspects; and an image display device configured to perform display in the display region.

A ninth aspect of the present disclosure is a vehicle including the vehicular display system of the eighth aspect.

A tenth aspect of the present disclosure is a display method including: detecting when a right-side operation region provided on a right side of a steering wheel has been operated; detecting when a left-side operation region provided on a left side of the steering wheel has been operated; in a case in which operation of the right-side operation region has been detected, display a right-side image corresponding to the right-side operation region in a right-side area of a display region set in front of a driving seat; and in a case in which operation of the left-side operation region has been detected, display a left-side image corresponding to the left-side operation region in a left-side area of the display region.

An eleventh aspect of the present disclosure is a non-transitory computer-readable medium storing a program for causing a computer to execute processing including: detecting when a right-side operation region provided on a right side of a steering wheel has been operated; detecting when a left-side operation region provided on a left side of the steering wheel has been operated; in a case in which operation of the right-side operation region has been detected, display a right-side image corresponding to the right-side operation region in a right-side area of a display region set in front of a driving seat; and in a case in which operation of the left-side operation region has been detected, display a left-side image corresponding to the left-side operation region in a left-side area of the display region.

In the above aspects, the vehicular display control device, the vehicular display system, the vehicle, the display method, and the non-transitory computer-readable medium storing a program according to the present disclosure enable occupant usability to be improved in configurations capable of displaying an image of an operation region.

BRIEF DESCRIPTION OF THE DRAWINGS

Exemplary embodiments will be described in detail based on the following figures, wherein.

DETAILED DESCRIPTION

Explanation follows regarding a vehicular display system S according to an exemplary embodiment, with reference to the drawings.

Figure 1:
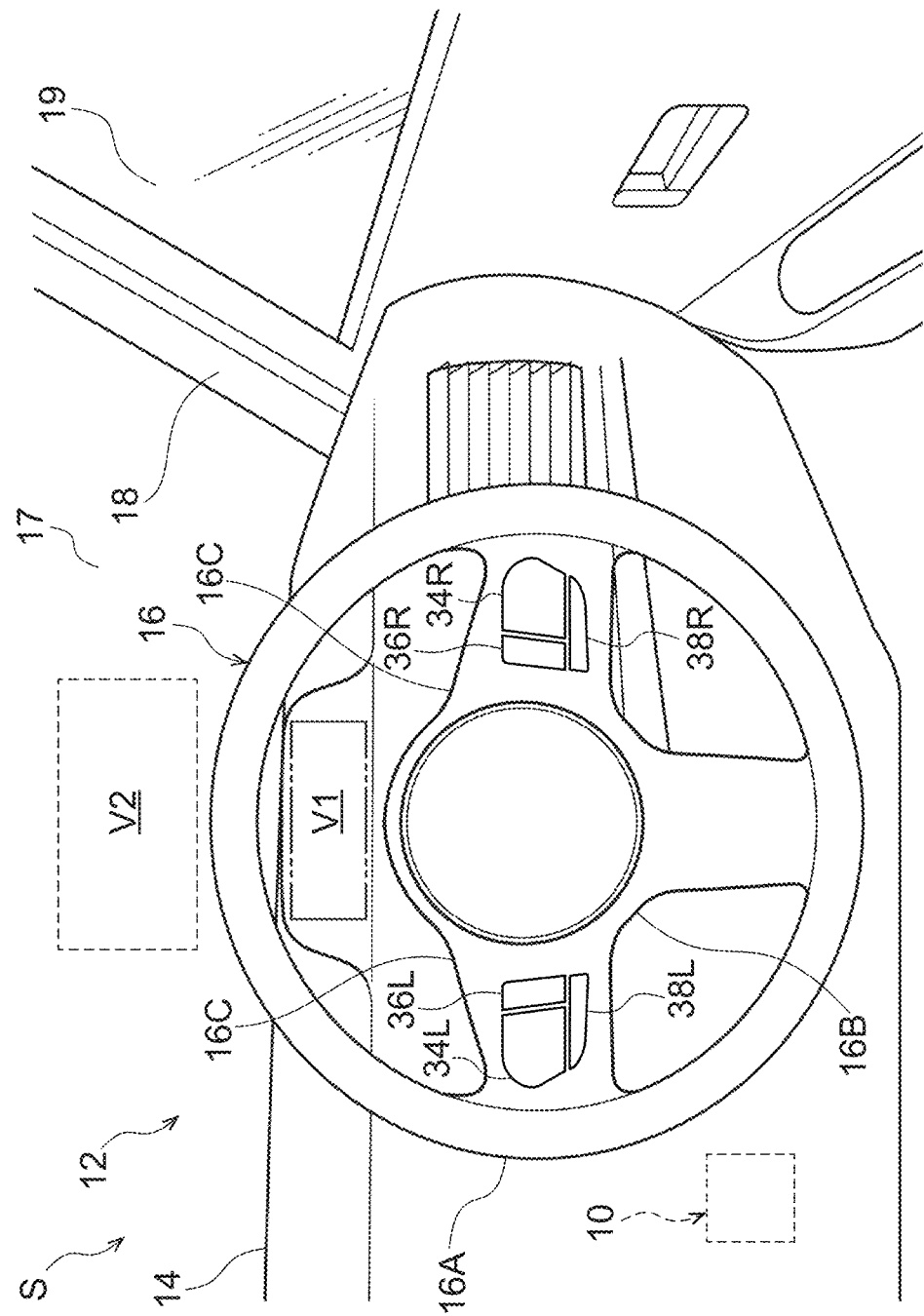
FIG. 1 is a schematic view of a front section inside a vehicle cabin of a vehicle applied with a vehicular display system according to an exemplary embodiment, as viewed from a vehicle rear side.

As illustrated in FIG. 1, an instrument panel 14 is provided to a front section inside a vehicle cabin of a vehicle 12. The instrument panel 14 extends along a vehicle width direction, and a steering wheel 16 is provided on a vehicle right side of the instrument panel 14. Namely, in the present exemplary embodiment as an example, the vehicle is a right-hand drive vehicle in which the steering wheel 16 is provided on the right side, and a driving seat is set on the vehicle right side. A first right-side operation switch 34R, a second right-side operation switch 36R, a right-side function switchover switch 38R, a first left-side operation switch 34L, a second left-side operation switch 36L, and a left-side function switchover switch 38L are provided on the steering wheel 16. Note that the first right-side operation switch 34R, the second right-side operation switch 36R, and the right-side function switchover switch 38R correspond to a right-side operation region of the present disclosure. The first left-side operation switch 34L, the second left-side operation switch 36L, and the left-side function switchover switch 38L correspond to a left-side operation region of the present disclosure. These switches are described later.

A windshield glass 17 is provided at a front end section of the instrument panel 14. The windshield glass 17 extends along a vehicle vertical direction and the vehicle width direction so as to partition between the vehicle cabin interior and vehicle cabin exterior.

A vehicle right side end portion of the windshield glass 17 is fixed to a front pillar 18 on the vehicle right side. The front pillar 18 extends along the vehicle vertical direction. The windshield glass 17 is fixed to a vehicle width direction inside end portion of the front pillar 18. A front end portion of a front side glass 19 is fixed to a vehicle width direction outside end portion of the front pillar 18. Note that a vehicle left side end portion of the windshield glass 17 is fixed to a non-illustrated front pillar on a vehicle left side.

An image display region V1 is provided on the instrument panel 14. The display region V1 is a meter display positioned on the vehicle right side of the instrument panel 14, and displays predetermined information through a first image display device 40 (see FIG. 2). The first image display device 40 is connected to various meter equipment installed to the vehicle 12, and is provided at a position that enters the field of view of a driver in a state in which their gaze is directed toward the vehicle front.

An image display region V2 is provided to the windshield glass 17. The display region V2 is set at a vehicle upper side of the display region V1, and is configured by a projection surface that a second image display device 42 (see FIG. 2) projects onto. Note that the second image display device 42 is a head-up display device provided at a vehicle front side of the instrument panel 14. Images are projected onto the display region V2 of the windshield glass 17 from the second image display device 42 configured by the head-up display device. Namely, the display region V2 configures a part of the windshield glass 17 that serves as the projection surface of the head-up display device.

Note that the steering wheel 16 includes a substantially circular ring-shaped rim 16A. A hub 16B configuring a central portion is provided at an inner circumferential side of the rim 16A. The right side of the rim 16A and the hub 16B are coupled together by a spoke 16C, and the left side of the rim 16A and the hub 16B are similarly coupled together by a spoke 16C. The first right-side operation switch 34R, the second right-side operation switch 36R, and the right-side function switchover switch 38R are provided on the right-side spoke 16C. The first left-side operation switch 34L, the second left-side operation switch 36L, and the left-side function switchover switch 38L are provided on the left-side spoke 16C.

The first right-side operation switch 34R is formed in a substantially rectangular shape, and is disposed at an upper-right portion of the right-side spoke 16C. The first right-side operation switch 34R is configured capable of receiving input on four sides, these being upper, lower, left, and right sides, and functions are allocated to each side.

Note that in the present exemplary embodiment as an example, a non-illustrated static sensor is installed to the first right-side operation switch 34R, such that a touched function is selected when an occupant touches the first right-side operation switch 34R. If the occupant then presses the first right-side operation switch 34R in a state in which the function has been selected, the selected function is executed. Similar static sensors are installed to the second right-side operation switch 36R, the right-side function switchover switch 38R, the first left-side operation switch 34L, the second left-side operation switch 36L, and the left-side function switchover switch 38L.

The second right-side operation switch 36R is formed in a substantially elongated rectangular shape with its length direction along the vertical direction, and is disposed at the left side of the first right-side operation switch 34R. The second right-side operation switch 36R is configured capable of receiving input on two sides, these being upper and lower sides, and functions are allocated to each side.

The right-side function switchover switch 38R is formed in a substantially elongated rectangular shape with its length direction along a left-right direction, and is disposed at the lower side of the first right-side operation switch 34R and the second right-side operation switch 36R. The right-side function switchover switch 38R is a switch for switching over functions. Specifically, by operating the right-side function switchover switch 38R, the functions allocated to the first right-side operation switch 34R and those allocated to the second right-side operation switch 36R are switched over. In the present exemplary embodiment as an example, two functions are allocated to each of these operation switches, and these functions are switched over whenever the right-side function switchover switch 38R is operated.

The first left-side operation switch 34L is formed in a substantially rectangular shape that has left-right symmetry to the first right-side operation switch 34R about a vertical center line of the steering wheel 16, and is disposed at an upper-left portion of the left-side spoke 16C. The first left-side operation switch 34L is configured capable of receiving input on four sides, these being upper, lower, left, and right sides, and functions are allocated to each side.

The second left-side operation switch 36L is formed in a substantially elongated rectangular shape that has left-right symmetry to the second right-side operation switch 36R about a vertical center line of the steering wheel 16, and is disposed at the right side of the first left-side operation switch 34L. The second left-side operation switch 36L is configured capable of receiving input on two sides, these being upper and lower sides, and functions are allocated to each side.

The left-side function switchover switch 38L is formed in a substantially elongated rectangular shape that has left-right symmetry to the right-side function switchover switch 38R about a vertical center line of the steering wheel 16, and is disposed at the lower side of the first left-side operation switch 34L and the second left-side operation switch 36L. The left-side function switchover switch 38L is a switch for switching over functions. Specifically, by operating the left-side function switchover switch 38L, the functions allocated to the first left-side operation switch 34L and those allocated to the second left-side operation switch 36L are switched over.

Note that a vehicular display control device 10 is provided to the vehicle 12. The vehicular display control device 10 of the present exemplary embodiment is for example a display electronic control unit (ECU) that performs various controls.

Figure 2:
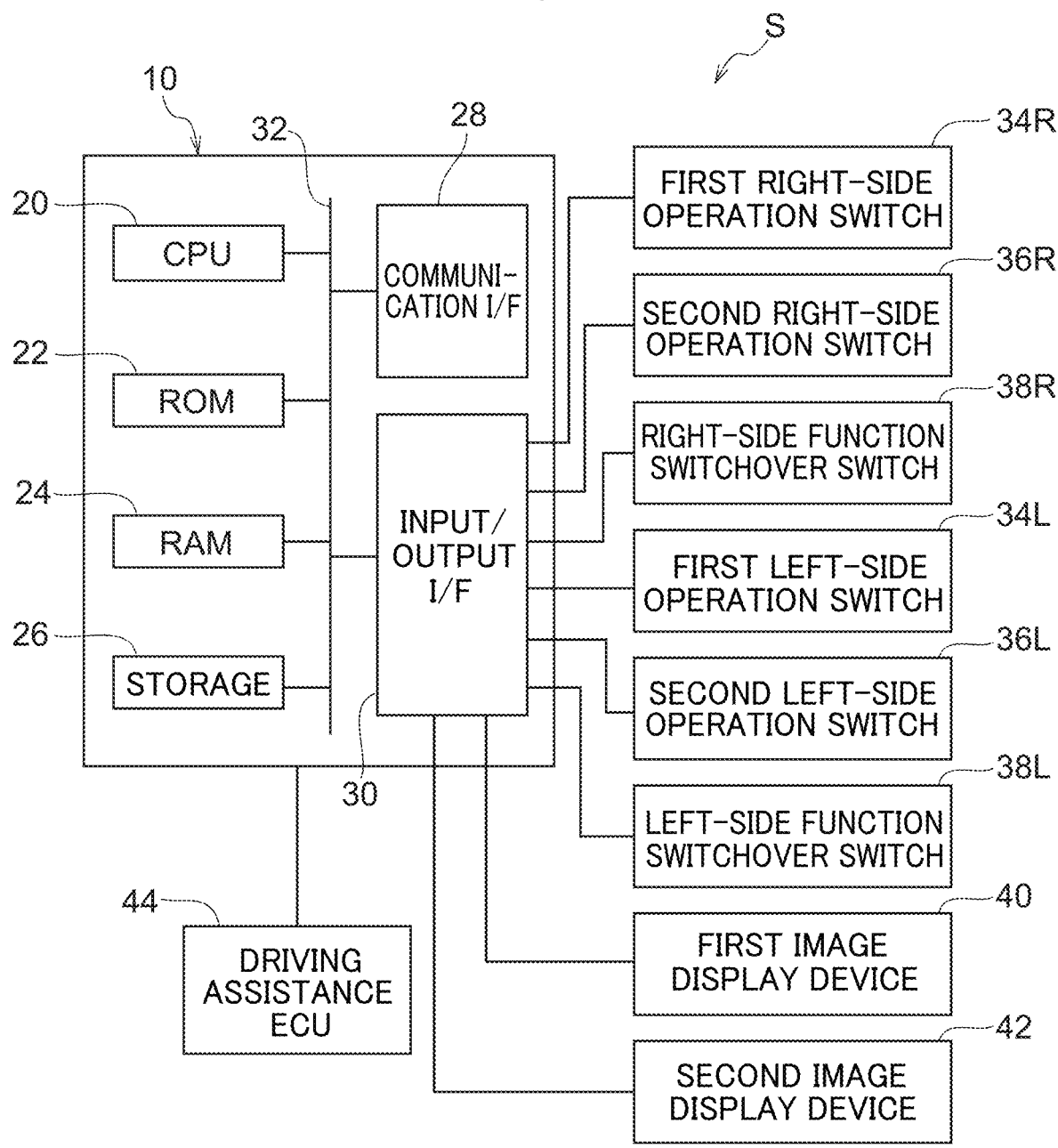
FIG. 2 is a block diagram illustrating a hardware configuration of a vehicular display system according to an exemplary embodiment.

As illustrated in FIG. 2, the vehicular display system S is configured including the vehicular display control device 10.

The vehicular display control device 10 is configured including a central processing unit (CPU; processor) 20, read only memory (ROM) 22, random access memory (RAM) 24, storage 26, a communication interface (communication I/F) 28, and an input/output interface (input/output I/F) 30. The respective configuration elements are connected so as to be capable of communicating with one another through an internal bus 32.

The CPU 20 is a central processing unit that executes various programs and controls respective sections. Namely, the CPU 20 reads a program from the ROM 22 or the storage 26, and executes the program using the RAM 24 as a workspace. The CPU 20 also controls the respective configuration elements and performs various arithmetic processing according to the programs recorded in the ROM 22 or the storage 26.

The ROM 22 holds various programs and various data. The RAM 24 acts as a workspace to temporarily store programs or data. The storage 26 is configured by a hard disk drive (HDD) or a solid state drive (SSD), and is a non-transitory recording medium that holds various programs including an operating system, and various data. In the present exemplary embodiment, programs such as a program for performing display processing are held in the ROM 22 or the storage 26.

The communication I/F 28 is an interface enabling the vehicular display control device 10 to communicate with an external server and other equipment, and a standard such as a Controller Area Network (CAN), Ethernet (registered trademark), Long Term Evolution (LTE), Fiber Distributed Data Interface (FDDI), or Wi-Fi (registered trademark) may be employed therefor.

The first right-side operation switch 34R, the second right-side operation switch 36R, the right-side function switchover switch 38R, the first left-side operation switch 34L, the second left-side operation switch 36L, the left-side function switchover switch 38L, the first image display device 40, and the second image display device 42 are electrically connected to the input/output interface 30.

The first image display device 40 is a device for performing a predetermined display on the display region V1 of the meter display. The second image display device 42 is a device for performing a predetermined display on the display region V2 of the head-up display.

The vehicular display control device 10 is electrically connected to a driving assistance ECU 44. As an example, the driving assistance ECU 44 of the present exemplary embodiment performs control such as active cruise control (ACC) and lane tracing assist (LTA). The driving assistance ECU 44 is thereby configured so as to be capable of acquiring signals from various sensors that detect the surroundings of the vehicle 12.

The vehicular display control device 10 implements various functionality using the above-described hardware resources. Explanation follows regarding functional configuration implemented by the vehicular display control device 10, with reference to FIG. 3.

Figure 3:
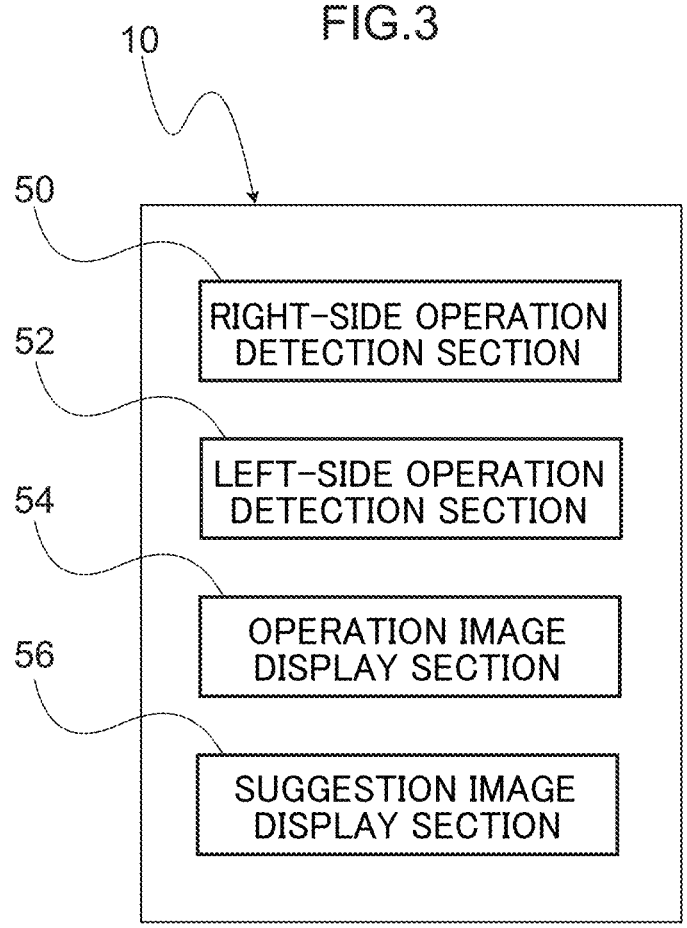
FIG. 3 is a block diagram illustrating a functional configuration of a vehicular display control device according to an exemplary embodiment.

As illustrated in FIG. 3, the vehicular display control device 10 is configured including as functional configuration a right-side operation detection section 50, a left-side operation detection section 52, an operation image display section 54, and a suggestion image display section 56. Note that the respective functional configuration is implemented by the CPU 20 reading and executing a program stored in the ROM 22 or the storage 26.

The right-side operation detection section 50 detects when the right-side operation region has been operated. Specifically, the right-side operation detection section 50 detects when any switch out of the first right-side operation switch 34R, the second right-side operation switch 36R, or the right-side function switchover switch 38R has been operated. Note that here "operation" includes not only an action by the occupant to press a switch, but also includes an action by the occupant to touch a switch. Thus, for example, the right-side operation detection section 50 detects when the occupant has touched the first right-side operation switch 34R using a signal from the corresponding static sensor. The right-side operation detection section 50 also detects when the occupant has pressed the first right-side operation switch 34R using a signal or the like from a corresponding pressure sensor.

The left-side operation detection section 52 detects when the left-side operation region has been operated. Specifically, the left-side operation detection section 52 detects when any switch out of the first left-side operation switch 34L, the second left-side operation switch 36L, or the left-side function switchover switch 38L has been operated. Thus, for example, the left-side operation detection section 52 detects when the occupant has touched the first left-side operation switch 34L using a signal from the corresponding static sensor. The left-side operation detection section 52 also detects when the occupant has pressed the first left-side operation switch 34L using a signal or the like from the corresponding pressure sensor.

In cases in operation of the right-side operation region has been detected, the operation image display section 54 displays a right-side image corresponding to the right-side operation region in a right-side area of the display region V2. In cases in which operation of the left-side operation region has been detected, the operation image display section 54 displays a left-side image corresponding to the left-side operation region in a left-side area of the display region V2. Explanation follows regarding this functionality of the operation image display section 54, with reference to FIG. 4 to FIG. 6.

Figure 4:
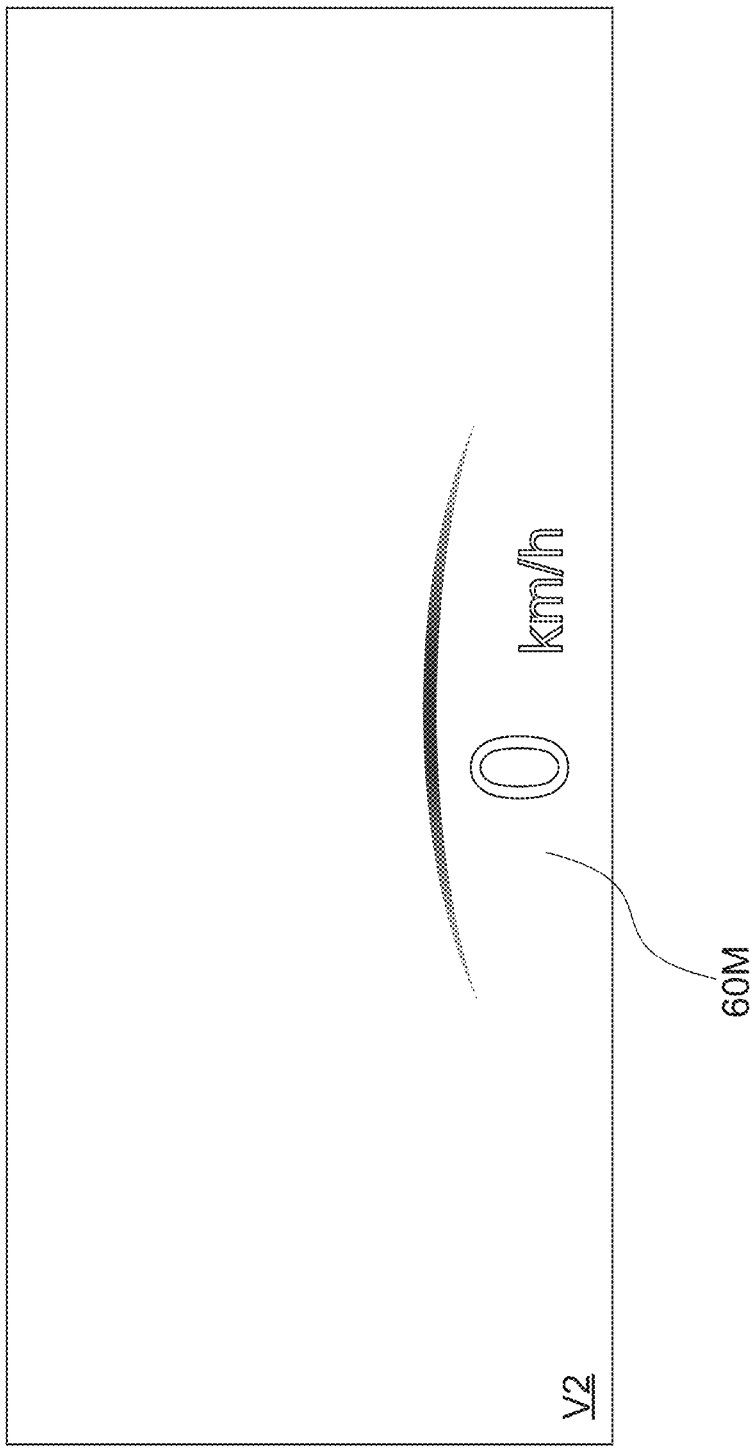
FIG. 4 is a diagram illustrating an example of a display on a display region in an exemplary embodiment, in a state in which right-side operation switches and left-side operation switches have not been touched.

FIG. 4 illustrates a state in which the occupant is not touching any operation switch. In this state, a central image 60M indicating a vehicle state is always displayed in a central area of the display region V2. In the present exemplary embodiment, a current speed of the vehicle 12 is displayed as the central image 60M. A substantially circular arc-shaped indicator is displayed above the speed.

Figure 5:
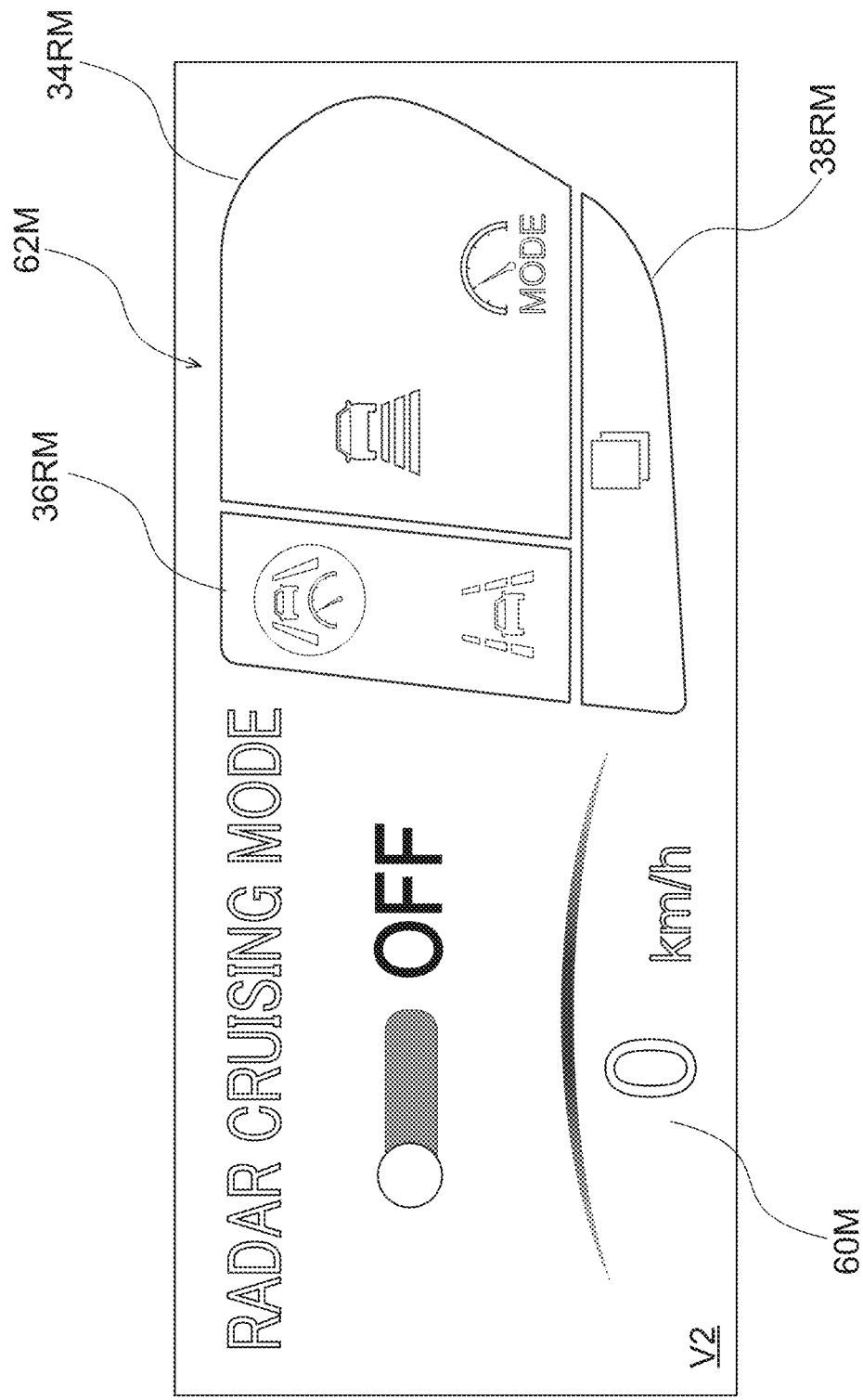
FIG. 5 is an example of a display following on from the state in FIG. 4, illustrating a state in which a right-side operation switch has been touched.

In cases in which the occupant has touched any switch out of the first right-side operation switch 34R, the second right-side operation switch 36R, or the right-side function switchover switch 38R following on from the state in FIG. 4, a transition is made to the state illustrated in FIG. 5. As illustrated in FIG. 5, a right-side image 62M is displayed in a right-side end area of the display region V2 using the functionality of the operation image display section 54.

The right-side image 62M is configured including a first right-side operation switch image 34RM with a shape representing the first right-side operation switch 34R, a second right-side operation switch image 36RM with a shape representing the second right-side operation switch 36R, and a right-side function switchover switch image 38RM with a shape representing the right-side function switchover switch 38R. FIG. 5 illustrates a state in which the occupant is touching an upper portion of the second right-side operation switch 36R, and so a mark at the upper side of the second right-side operation switch image 36RM is displayed surrounded by a circle.

As an example, icons are not displayed at an upper portion and a right-side portion of the first right-side operation switch image 34RM. Namely, the design is such that no icon is displayed at a location where no function has been allocated.

An icon relating to setting inter-vehicle distance is displayed at a left-side portion of the first right-side operation switch image 34RM. When this icon is selected, the inter-vehicle distance can be set. Namely, an inter-vehicle distance setting function has been allocated to the left-side portion of the first right-side operation switch 34R.

An icon relating to switching travel modes is displayed at a lower portion of the first right-side operation switch image 34RM. When this icon is selected, the travel mode can be switched. Namely, a travel mode switchover function has been allocated to the lower portion of the first right-side operation switch 34R.

An icon relating to switching a radar cruising mode ON and OFF is displayed at an upper portion of the second right-side operation switch image 36RM. When this icon is selected, the radar cruising mode can be switched ON and OFF. An icon relating to switching LTA ON and OFF is displayed at a lower portion of the second right-side operation switch image 36RM. When this icon is selected, LTA can be switched ON and OFF. Information relating to driving assistance is displayed in the right-side image 62M in this manner.

A function switchover icon is displayed in the right-side function switchover switch image 38RM. When this icon is selected, the functions allocated to the first right-side operation switch 34R and those allocated to the second right-side operation switch 36R are switched over.

Note that the operation image display section 54 is configured so as to move the central image 60M toward the left side from its position in FIG. 4, and to display the right-side image 62M further toward the right side than the central image 60M. Although not illustrated in the drawings, the operation image display section 54 of the present exemplary embodiment displays the right-side image 62M as an animation so as to move from a lower-right side end of the display region V2. Namely, the operation image display section 54 causes the right-side image 62M to emerge into view in the display region V2 from the lower-right side of where the right-side operation region is to be positioned.

Details of the function allocated to the switch that the occupant is touching are displayed further toward the left side than the right-side image 62M.

Figure 6:
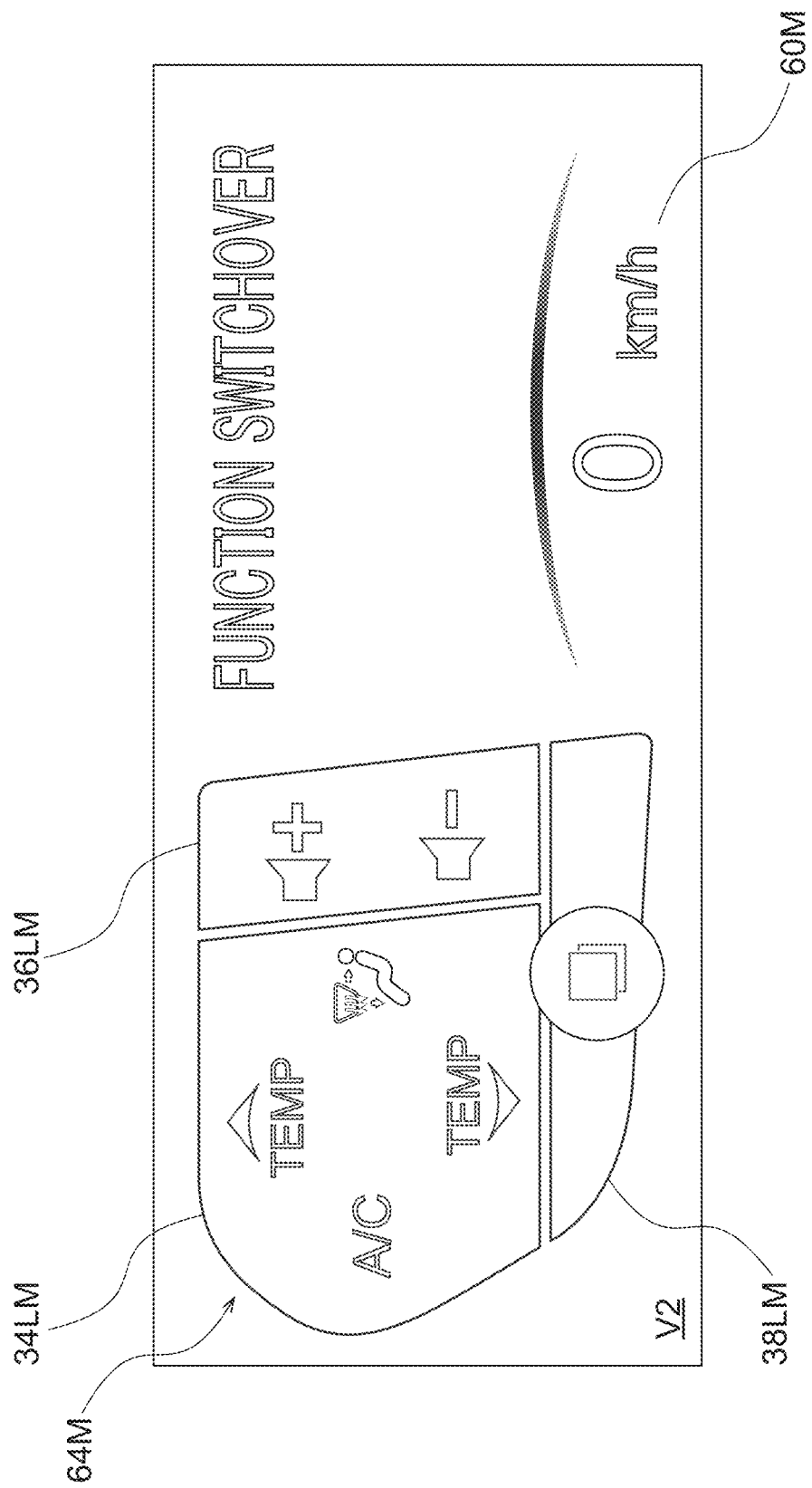
FIG. 6 is an example of a display following on from the state in FIG. 4, illustrating a state in which a left-side operation switch has been touched.

On the other hand, in cases in which the occupant has touched any switch out of the first left-side operation switch 34L, the second left-side operation switch 36L, or the left-side function switchover switch 38L following on from the state in FIG. 4, a transition is made to the state illustrated in FIG. 6. As illustrated in FIG. 6, a left-side image 64M is displayed in a left-side end area of the display region V2 using the functionality of the operation image display section 54.

The left-side image 64M is configured including a first left-side operation switch image 34LM with a shape representing the first left-side operation switch 34L, a second left-side operation switch image 36LM with a shape representing the second left-side operation switch 36L, and a left-side function switchover switch image 38LM with a shape representing the left-side function switchover switch 38L. FIG. 6 illustrates a state in which the occupant is touching the left-side function switchover switch 38L, and so the left-side function switchover switch image 38LM is displayed surrounded by a circle.

A icon relating to an air conditioner function is displayed at a left-side portion of the first left-side operation switch image 34LM. When this icon is selected, the air conditioner function can be switched ON and OFF.

An icon indicating airflow directions is displayed at a right-side portion of the first left-side operation switch image 34LM. When this icon is selected, the airflow direction can be changed. Icons for changing the set temperature of the air conditioner are respectively displayed at upper and lower portions of the first left-side operation switch image 34LM.

A volume up icon is displayed at an upper portion of the second left-side operation switch image 36LM. When this icon is selected, the volume of music or the like being played inside the vehicle cabin is increased by a predetermined amount. A volume down icon is displayed at a lower portion of the second left-side operation switch image 36LM. When this icon is selected, the volume is reduced by a predetermined amount. Information relating to onboard equipment is displayed in the left-side image 64M in this manner.

A function switchover icon is displayed in the left-side function switchover switch image 38LM. When this icon is selected, the functions allocated to the first left-side operation switch 34L and those allocated to the second left-side operation switch 36L are switched over.

Note that the operation image display section 54 is configured so as to move the central image 60M toward the right side from its position in FIG. 4, and to display the left-side image 64M further toward the left side than the central image 60M. Although not illustrated in the drawings, the operation image display section 54 of the present exemplary embodiment displays the left-side image 64M as an animation so as to move from a lower-left-side end of the display region V2. Namely, the operation image display section 54 causes the left-side image 64M to emerge into view in the display region V2 from the lower-left side of where the left-side operation region is to be positioned.

Details of the function allocated to the switch that the occupant is touching are displayed further toward the right side than the left-side image 64M.

Furthermore, in cases in which the operation image display section 54 of the present exemplary embodiment has detected operation of both the right-side operation region and the left-side operation region by the occupant, the operation image display section 54 is set so as to display the right-side image 62M alone. Namely, in cases in which the occupant is touching both the first right-side operation switch image 34RM and the first left-side operation switch image 34LM, the operation image display section 54 displays the right-side image 62M on the display region V2.

The suggestion image display section 56 illustrated in FIG. 3 displays a right-side suggestion image selectable using the right-side operation region, or a left-side suggestion image selectable using the left-side operation region, in the display region V2. Specifically, in cases in which a check item for the occupant or a suggestion item for the occupant has been received from the driving assistance ECU 44, a navigation system, or the like, the suggestion image display section 56 displays the content of this check item or suggestion item on the display region V2. Explanation follows regarding this functionality of the suggestion image display section 56, with reference to FIG. 7.

Figure 7:
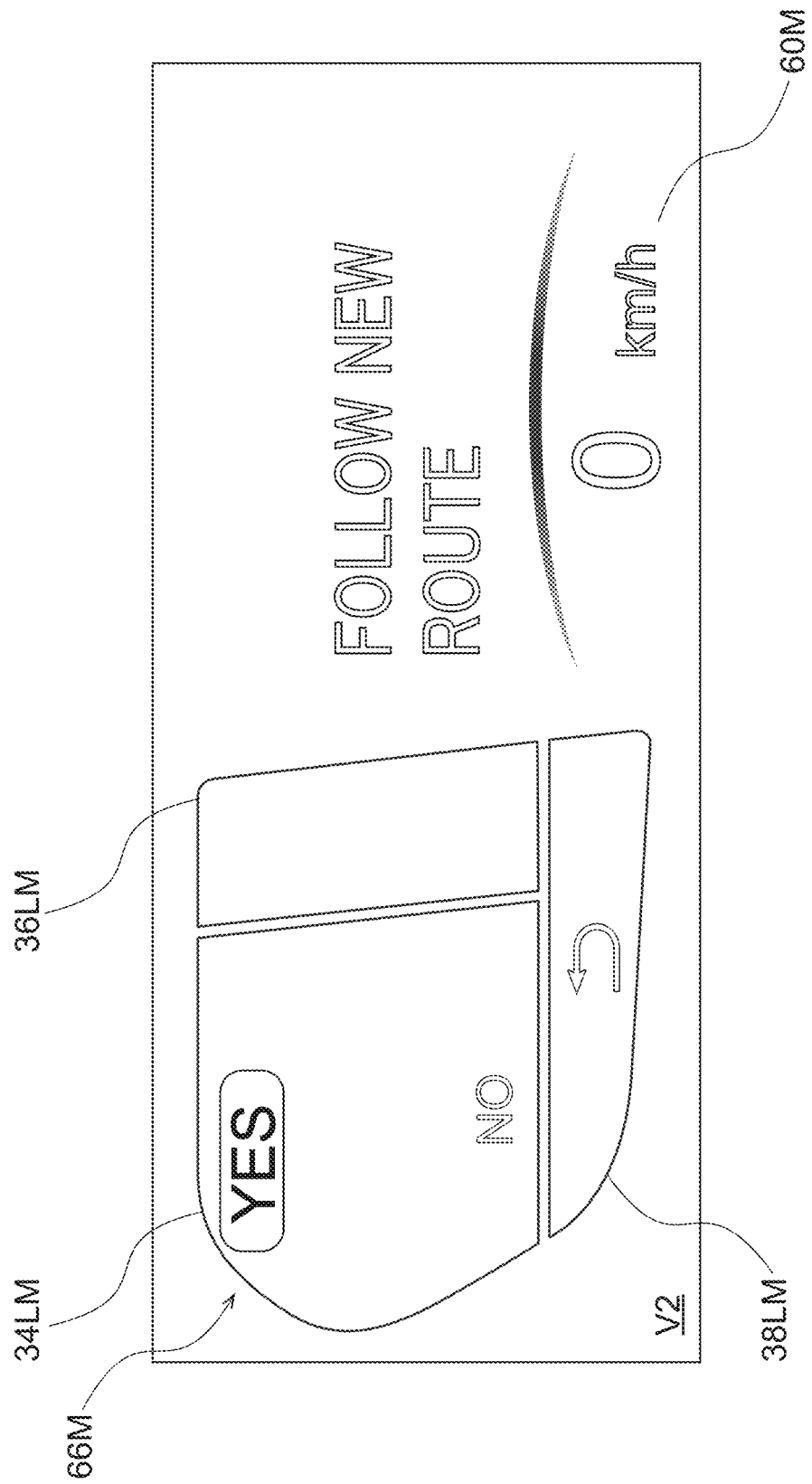
FIG. 7 is an example of a display illustrating a state in which a left-side suggestion image is being displayed.

For example, in cases in which a suggestion for a new route has been received from the navigation system, a transition is made from the state in FIG. 4 to the state in FIG. 7. In FIG. 7, a left-side suggestion image 66M is displayed in the display region V2 by the suggestion image display section 56.

The left-side suggestion image 66M is configured including the first left-side operation switch image 34LM, the second left-side operation switch image 36LM, and the left-side function switchover switch image 38LM. FIG. 7 illustrates a state in which the occupant is touching the upper portion of the first left-side operation switch image 34LM, and so an icon at the upper portion of the first left-side operation switch image 34LM is displayed surrounded by a circle.

There is no display performed in the left and right portions of the first left-side operation switch image 34LM. An icon for accepting the suggestion is displayed at the upper portion of the first left-side operation switch image 34LM. An icon for refusing the suggestion is displayed at the lower portion of the first left-side operation switch image 34LM.

An icon to return to the previous display is displayed in the left-side function switchover switch image 38LM. When this icon is selected, the display switches to the first left-side operation switch image 34LM, the second left-side operation switch image 36LM, and the left-side function switchover switch image 38LM in the state prior to the suggestion being displayed.

Next, explanation follows regarding operation of the present exemplary embodiment.

Figure 8:
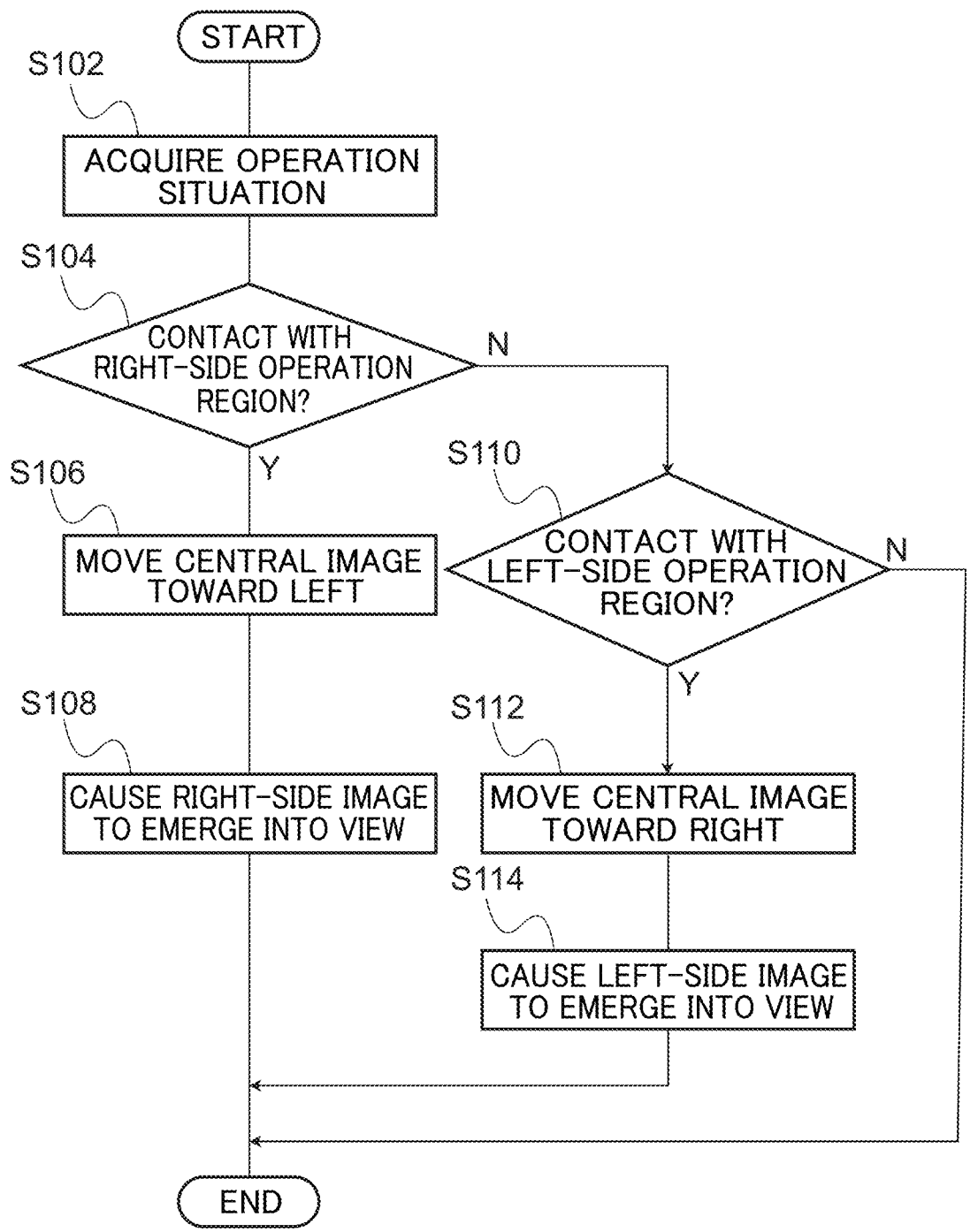
FIG. 8 is a flowchart illustrating an example of a flow of display processing of an exemplary embodiment.

Explanation follows regarding an example of display processing by the vehicular display control device 10, with reference to the flowchart illustrated in FIG. 8. The display processing is executed by the CPU 20 reading a display program from the ROM 22 or the storage 26, and deploying and executing the display program in the RAM 24.

At step S102, the CPU 20 acquires an operation situation of each of the operation regions. Specifically, the CPU 20 acquires information from the non-illustrated static sensors that are respectively installed to the first right-side operation switch 34R, the second right-side operation switch 36R, the right-side function switchover switch 38R, the first left-side operation switch 34L, the second left-side operation switch 36L, and the left-side function switchover switch 38L.

At step S104, the CPU 20 determines whether or not the hand of the occupant is contacting the right-side operation region. Specifically, in cases in which the CPU 20 has detected using the functionality of the right-side operation detection section 50 that the hand of the occupant is contacting any switch out of the first right-side operation switch 34R, the second right-side operation switch 36R, or the right-side function switchover switch 38R, step S104 is affirmative and processing transitions to step S106. On the other hand, in cases in which the CPU 20 has not detected using the functionality of the right-side operation detection section 50 that the hand of the occupant has contacted any switch out of the first right-side operation switch 34R, the second right-side operation switch 36R, or the right-side function switchover switch 38R, step S104 is negative and processing transitions to step S110. The processing of step S110 onward is described later.

At step S106, the CPU 20 uses the functionality of the operation image display section 54 to move the central image 60M toward the left side. At step S108, the CPU 20 causes the right-side image 62M to emerge into view in the display region V2 (see FIG. 5).

On the other hand, in cases in which the hand of the occupant has not contacted the right-side operation region, at step S110, the CPU 20 determines whether or not the hand of the occupant has contacted the left-side operation region. Specifically, in cases in which the CPU 20 has detected using the functionality of the left-side operation detection section 52 that the hand of the occupant is touching any switch out of the first left-side operation switch 34L, the second left-side operation switch 36L, or the left-side function switchover switch 38L, step S110 is affirmative and processing transitions to step S112. On the other hand, in cases in which the CPU 20 has not detected using the functionality of the left-side operation detection section 52 that the hand of the occupant has contacted any switch out of the first left-side operation switch 34L, the second left-side operation switch 36L, or the left-side function switchover switch 38L, step S110 is negative and the display processing is ended.

At step S112, the CPU 20 uses the functionality of the operation image display section 54 to move the central image 60M toward the right side. At step S114, the CPU 20 causes the left-side image 64M to emerge into view in the display region V2 (see FIG. 6).

As described above, in the vehicular display control device 10 according to the present exemplary embodiment, the right-side image 62M corresponding to the right-side operation region is displayed in the right-side area of the display region V2 set in front of the driving seat in cases in which the right-side operation region provided on the right side of the steering wheel 16 has been operated. Similarly, the left-side image 64M corresponding to the left-side operation region is displayed in the left-side area of the display region V2 in cases in which the left-side operation region provided on the left side of the steering wheel 16 has been operated. This enables a wide area of the display region V2 to be secured compared to cases in which both the right-side image 62M and the left-side image 64M are always displayed on the display region V2.

In particular, in cases in which the display region V2 is set as a part of the windshield glass 17 as in the present exemplary embodiment, the contents of the right-side image 62M and those of the left-side image 64M can be checked in a state in which the occupant is directing their gaze toward the front while driving.

Moreover, in the present exemplary embodiment, since the right-side image 62M is displayed in the right-side area of the display region V2 whereas the left-side image 64M is displayed in the left-side area of the display region V2, the occupant can intuitively ascertain which operation region the displayed image corresponds to out of the right-side operation region or the left-side operation region.

Furthermore, in the present exemplary embodiment, since the right-side image 62M is displayed on the right side of the central image 60M whereas the left-side image 64M is displayed on the left side of the central image 60M, the occupant can even more easily ascertain which operation region the displayed image corresponds to out of the right-side operation region or the left-side operation region.

Furthermore, in the present exemplary embodiment, the central image 60M is moved when the right-side image 62M or the left-side image 64M is to be displayed, thereby enabling the corresponding right-side image 62M or left-side image 64M to be displayed in a large size, even in cases in which the display region V2 is relatively small.

Moreover, in the present exemplary embodiment, since the right-side image 62M or the left-side image 64M is displayed as an animation, the occupant can intuitively ascertain that the image (the right-side image or left-side image) displayed on the display region V2 corresponds to an operation region (the left-side operation region or right-side operation region) provided on the steering wheel 16.

Furthermore, in the present exemplary embodiment, in cases in which operation of both the right-side operation region and the left-side operation region has been detected, display of the right-side image 62M is prioritized. This enables the occupant to prioritize checking information relating to driving assistance.

Furthermore, in the present exemplary embodiment, in cases in which a suggestion from the navigation system or the like is displayed using the right-side suggestion image or the left-side suggestion image, this suggestion is displayed at a position corresponding to the pertinent operation region, thereby enabling the occupant to intuitively ascertain the position of the operation region they should operate.

Although the vehicular display system S and the vehicular display control device 10 according to the present exemplary embodiment have been described above, obviously various modifications may be implemented within a range not departing from the spirit of the present disclosure. For example, although an example of display in the display region V2 has been described in the above exemplary embodiment, there is no limitation thereto, and the corresponding right-side image or left-side image may be displayed in the display region V1.

Moreover, although a state has been illustrated and described in which the left-side suggestion image 66M is displayed by the suggestion image display section 56 as illustrated in FIG. 7 in the above exemplary embodiment, a right-side suggestion image may be displayed by the suggestion image display section 56. Specifically, the suggestion image display section 56 may display a right-side suggestion image further toward the right side than the central image 60M for an item selectable using the right-side operation region.

Furthermore, although a configuration has been illustrated and described in which the corresponding right-side image 62M or left-side image 64M emerges into view as an animation in the above exemplary embodiment, the image may also be made to retreat out of view when transitioning to a non-display state. For example, in cases in which the occupant has removed their hand from the right-side operation region while in the state illustrated in FIG. 5, the right-side image 62M may be made to retreat out of view by the operation image display section 54 after a predetermined duration has elapsed. Namely, the operation image display section 54 may display the right-side image 62M as an animation so as to move toward the lower-right side end. Furthermore, the operation image display section 54 may move the central image 60M to the center of the display region V2 after causing the right-side image 62M to retreat out of view, or at the same time as causing the right-side image 62M to retreat out of view.

Furthermore, there is no particular limitation to the number and shapes of the respective operation switches and respective function switchover switches, which may be modified as appropriate.

What is claimed is:

1. A vehicular display control device comprising:
   memory; and
   a processor coupled to the memory, wherein the processor is configured to:
   detect when a right-side operation region provided on a right side of a steering wheel has been operated;
   detect when a left-side operation region provided on a left side of the steering wheel has been operated;
   in a case in which operation of the right-side operation region has been detected, display a right-side image corresponding to the right-side operation region in a right-side area of a display region set in front of a driving seat;
   in a case in which operation of the left-side operation region has been detected, display a left-side image corresponding to the left-side operation region in a left-side area of the display region,
   display information relating to driving assistance in the right-side image and display information relating to onboard equipment in the left-side image; and
   display the information relating to driving assistance in cases in which operation of both the right-side operation region and the left-side operation region has been detected.

2. The vehicular display control device of claim 1, wherein the processor is configured to:
   always display a central image indicating a vehicle state in a central area of the display region; and
   display the right-side image further toward the right side than the central image, and display the left-side image further toward the left side than the central image.

3. The vehicular display control device of claim 2, wherein the processor is configured to move the central image toward the left side when displaying the right-side image, and move the central image toward the right side when displaying the left-side image.

4. The vehicular display control device of claim 1, wherein the processor is configured to:
   display the right-side image as an animation so as to move from a lower-right side end of the display region; and
   display the left-side image as an animation so as to move from a lower-left side end of the display region.

5. The vehicular display control device of claim 1, wherein the processor is configured to:
   display a right-side suggestion image that is selectable using the right-side operation region in the right-side area of the display region; and
   display a left-side suggestion image that is selectable using the left-side operation region in the left-side area of the display region.

6. The vehicular display control device of claim 1, wherein the processor is configured to display the right-side image and the left-side image in the display region set on a windshield glass using a head-up display device installed to a vehicle.

7. The vehicular display control device of claim 1, wherein the processor is configured to:
   display the right-side image as an animation so as to move toward a lower-right side end of the display region in a case in which end of the operation of the right-side operation region has been detected; and
   display the left-side image as an animation so as to move toward a lower-left side end of the display region in a case in which end of the operation of the left-side operation region has been detected.

8. The vehicular display control device of claim 7, wherein the processor is configured to:
   retreat the right-side image to be out of view from the lower-right side end of the display region, and
   retreat the left-side image to be out of view from lower-left side end of the display region.

9. A vehicular display system comprising:
   the vehicular display control device of claim 1; and
   an image display device configured to perform display in the display region.

10. A vehicle comprising the vehicular display system of claim 9.

11. A display method comprising:
    detecting when a right-side operation region provided on a right side of a steering wheel has been operated;
    detecting when a left-side operation region provided on a left side of the steering wheel has been operated;
    in a case in which operation of the right-side operation region has been detected, displaying a right-side image corresponding to the right-side operation region in a right-side area of a display region set in front of a driving seat;
    in a case in which operation of the left-side operation region has been detected, displaying a left-side image corresponding to the left-side operation region in a left-side area of the display region,
    displaying information relating to driving assistance in the right-side image and display information relating to onboard equipment in the left-side image; and
    displaying the information relating to driving assistance in cases in which operation of both the right-side operation region and the left-side operation region has been detected.

12. The display method of claim 11, wherein:
    displaying the right-side image as an animation such that the right-side image moves toward a lower-right side end of the display region in a case in which end of the operation of the right-side operation region has been detected; and displaying the left-side image as an animation such that the left-side image moves toward a lower-left side end of the display region in a case in which end of the operation of the left-side operation region has been detected.

13. The display method of claim 12, wherein:

retreating the right-side image to be out of view from the lower-right side end of the display region, and retreating the left-side image to be out of view from lower-left side end of the display region.

14. A non-transitory computer-readable medium storing a program for causing a computer to execute processing comprising:

detecting when a right-side operation region provided on a right side of a steering wheel has been operated;

detecting when a left-side operation region provided on a left side of the steering wheel has been operated;

in a case in which operation of the right-side operation region has been detected, displaying a right-side image corresponding to the right-side operation region in a right-side area of a display region set in front of a driving seat;

in a case in which operation of the left-side operation region has been detected, displaying a left-side image corresponding to the left-side operation region in a left-side area of the display region, displaying information relating to driving assistance in the right-side image and display information relating to onboard equipment in the left-side image; and displaying the information relating to driving assistance in cases in which operation of both the right-side operation region and the left-side operation region has been detected.

15. The non-transitory computer-readable medium of claim 14, the processing comprising:

displaying the right-side image as an animation such that the right-side image moves toward a lower-right side end of the display region in a case in which end of the operation of the right-side operation region has been detected; and displaying the left-side image as an animation such that the left-side image moves toward a lower-left side end of the display region in a case in which end of the operation of the left-side operation region has been detected.

16. The non-transitory computer-readable medium of claim 15, the processing comprising:

retreating the right-side image to be out of view from the lower-right side end of the display region, and retreating the left-side image to be out of view from lower-left side end of the display region.

* * * * *